April 3, 1956 J. SCHWARTZ ET AL 2,740,331
APPARATUS FOR PROCESSING A CONCAVE WORK OBJECT
Filed May 23, 1952 7 Sheets-Sheet 1

INVENTORS:
Joseph Schwartz &
Amos Ackley,
BY Paul & Paul
ATTORNEYS.

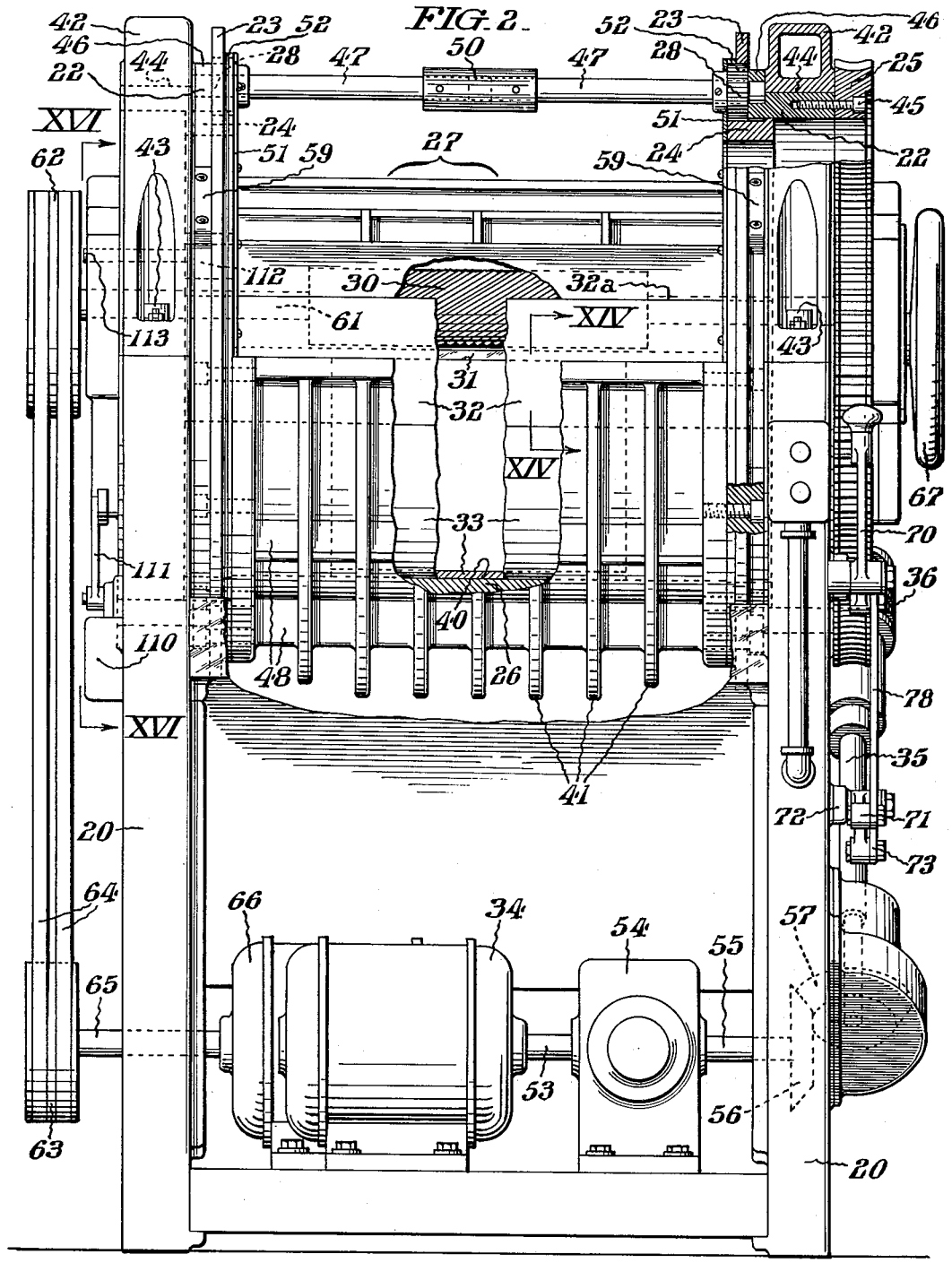

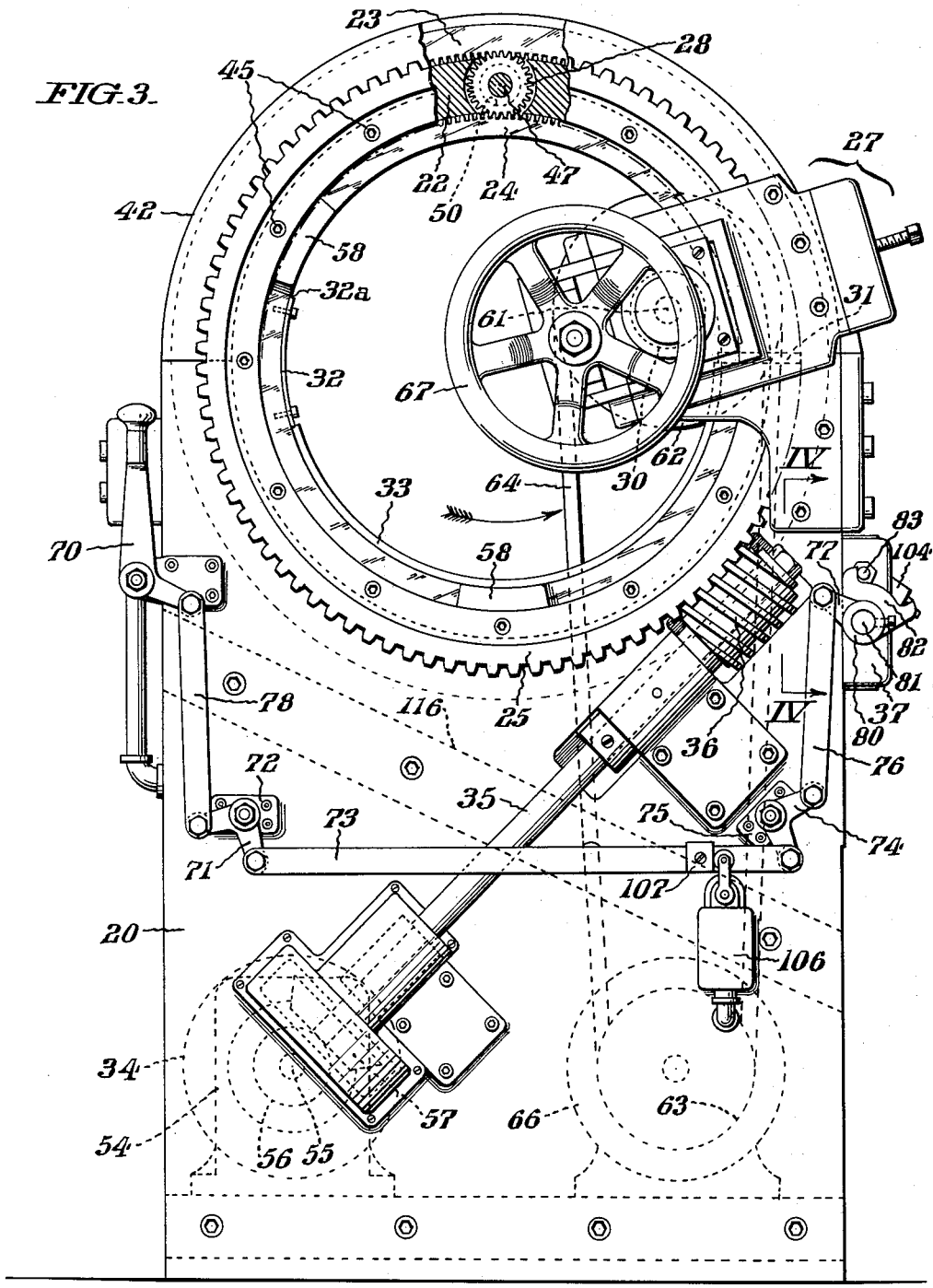

April 3, 1956   J. SCHWARTZ ET AL   2,740,331
APPARATUS FOR PROCESSING A CONCAVE WORK OBJECT
Filed May 23, 1952   7 Sheets-Sheet 4
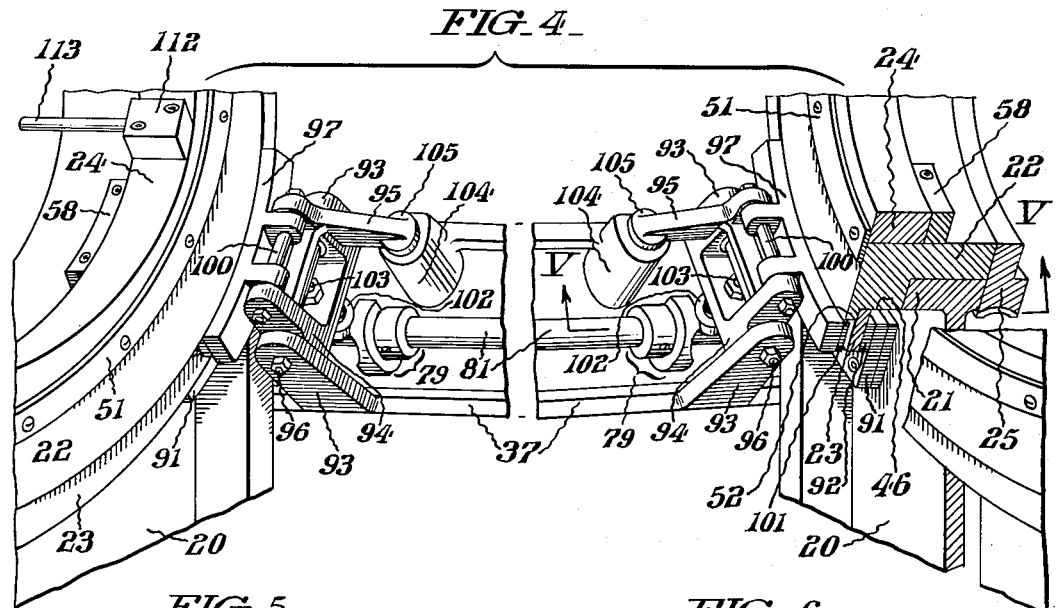
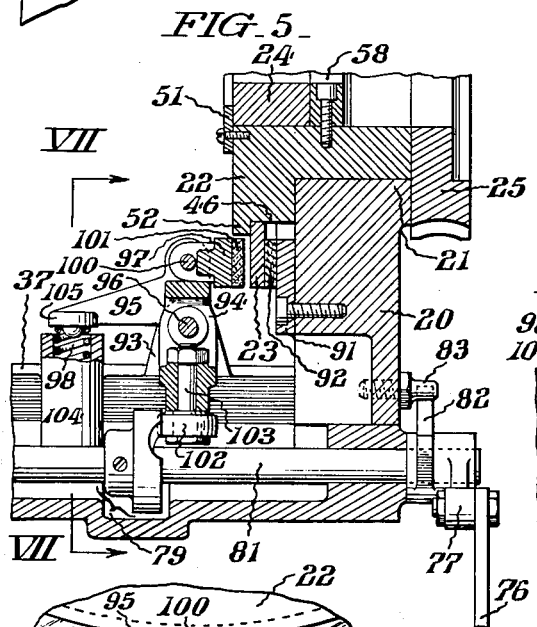
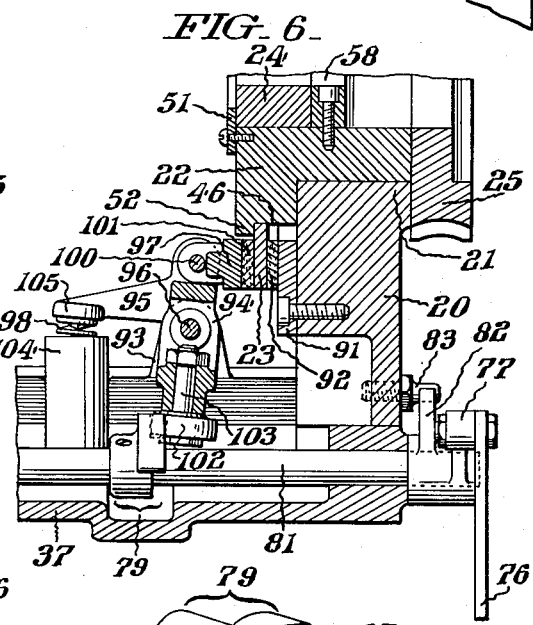
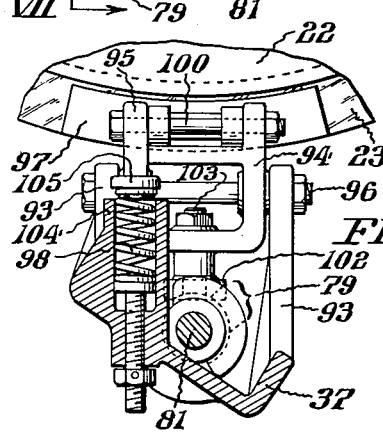
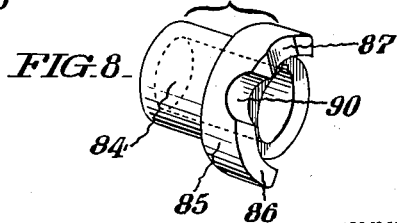
INVENTORS:
Joseph Schwartz &
Amos Ackley,
BY Paul & Paul
ATTORNEYS.

April 3, 1956    J. SCHWARTZ ET AL    2,740,331
APPARATUS FOR PROCESSING A CONCAVE WORK OBJECT
Filed May 23, 1952    7 Sheets-Sheet 5
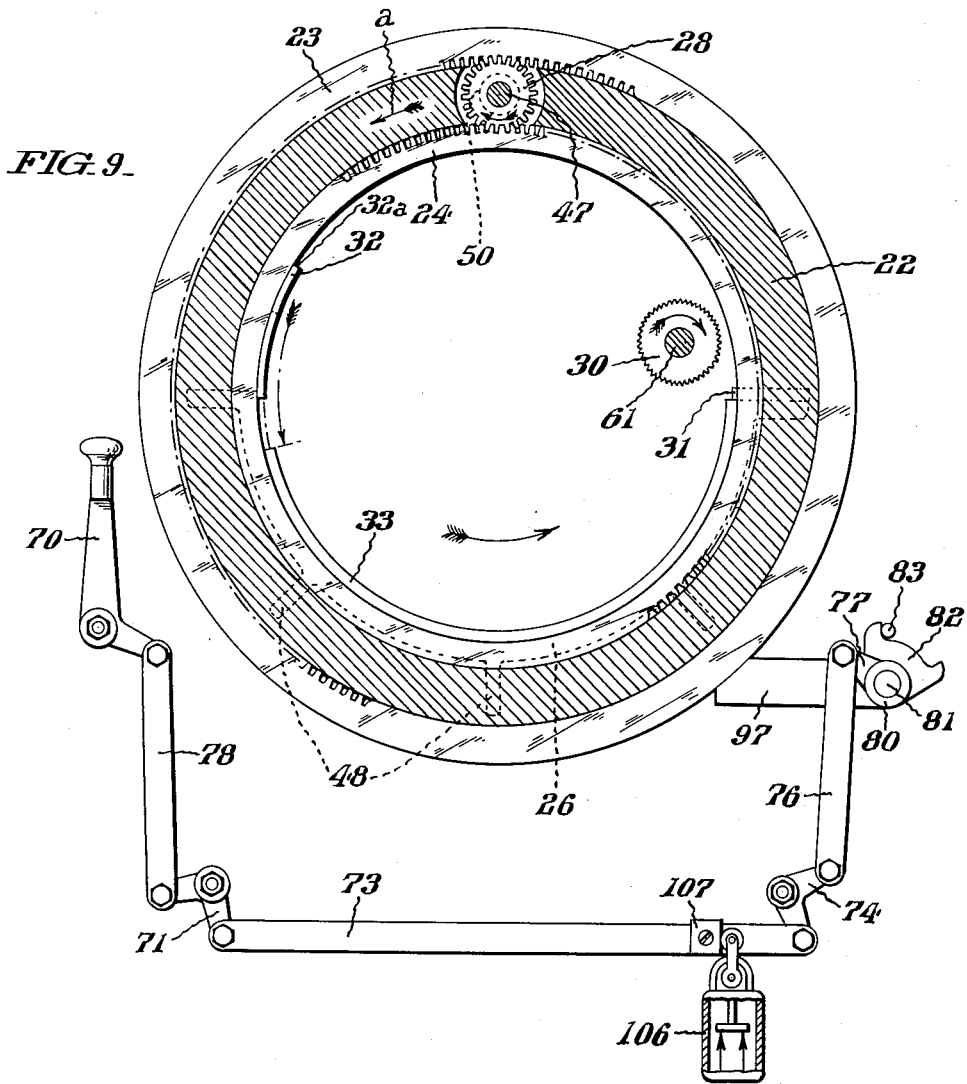
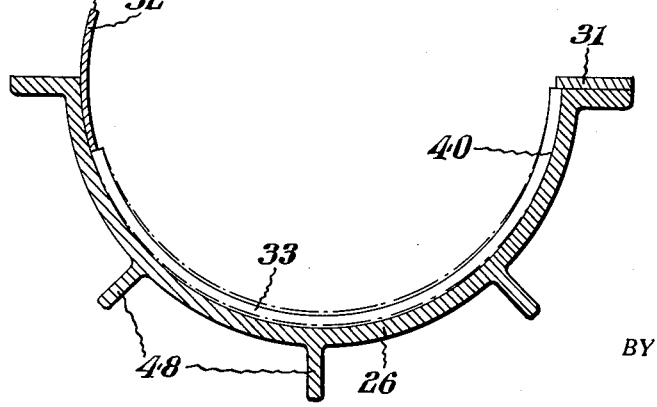
INVENTORS:
Joseph Schwartz &
Amos Ackley,
BY Paul & Paul
ATTORNEYS.

April 3, 1956 J. SCHWARTZ ET AL 2,740,331
APPARATUS FOR PROCESSING A CONCAVE WORK OBJECT
Filed May 23, 1952 7 Sheets-Sheet 6
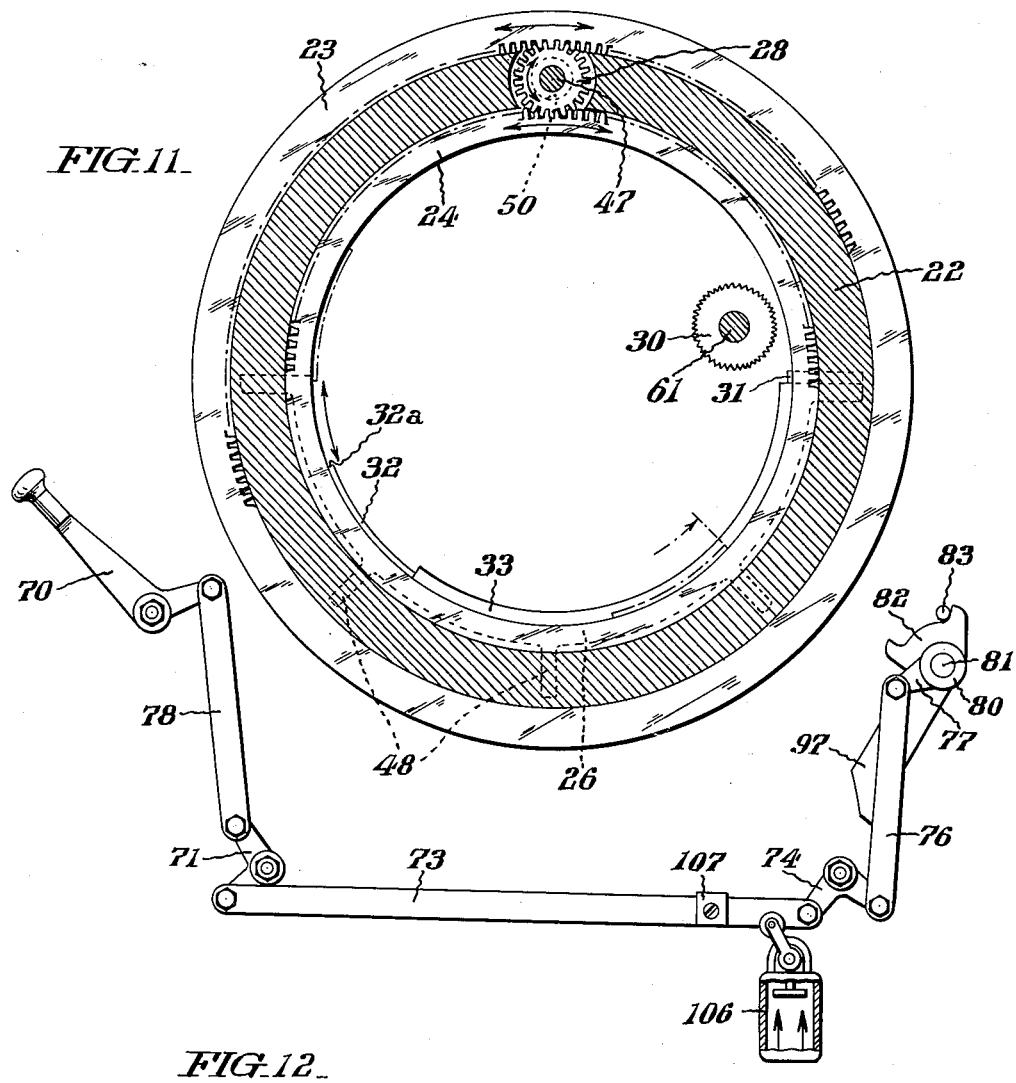
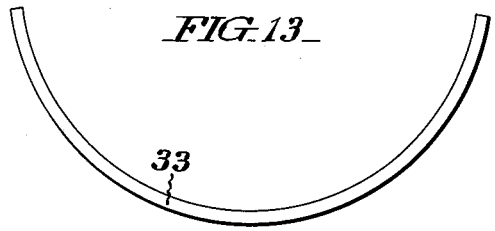
INVENTORS:
Joseph Schwartz &
Amos Ackley,
BY Paul & Paul
ATTORNEYS.

April 3, 1956 J. SCHWARTZ ET AL 2,740,331
APPARATUS FOR PROCESSING A CONCAVE WORK OBJECT
Filed May 23, 1952 7 Sheets-Sheet 7

INVENTORS:
Joseph Schwartz &
Amos Ackley,
BY Paul & Paul
ATTORNEYS.

United States Patent Office 2,740,331
Patented Apr. 3, 1956

2,740,331

APPARATUS FOR PROCESSING A CONCAVE WORK OBJECT

Joseph Schwartz, Melrose Park, Pa., and Amos Ackley, Camden, N. J., assignors to Westcott & Thomson, Inc., Philadelphia, Pa., a corporation of Pennsylvania Application May 23, 1952, Serial No. 289,512

7 Claims. (Cl. 90—20)

This invention relates to apparatus for processing concave work objects, and more particularly concerns a rotary shaving machine for shaving sheets, plates and like work objects having an exposed, concave face. As one specific example, the invention is particularly advantageous for shaving printing plates, the plate surfaces of which are parallel and concentric and assume the form of a section of a cylinder. More specifically, the invention relates to a machine for shaving cylindrical work objects of this type, wherein the work objects are automatically clamped in place in the machine and maintained under pressure exerted by the clamping means during and following the shaving operation.

Heretofore it has been the practice, when carrying out milling or shaving operations on curved work objects such as sheets or plates, to clamp each one of the work objects rigidly in position while the milling or shaving machine is inoperative. The machine is then energized and the milling or shaving operation carried into effect, whereupon the machine is ultimately stopped, the clamping means removed and the processed work object taken out of the machine. The performance of the foregoing steps is somewhat laborious and time consuming, and materially decreases the production capacity of the machine. Moreover, difficulty has been encountered in clamping relatively rigid printing plates uniformly in conventional machines, as a result of which the printing plates have not been shaved or milled uniformly and do not have a uniform thickness after such processing. Such non-uniform printing plates do not perform properly in automatic printing machines and do not provide a uniform printed impression on paper.

It is accordingly one object of this invention to provide an efficient, high speed apparatus for milling or shaving a concave work object. Another object of the invention is to provide apparatus for milling or shaving one face of a curved sheet or plate to produce a product having a precisely uniform thickness, and having ability to take a very deep cut.

Still another object of the invention is to provide milling or shaving apparatus for processing a curved work object wherein the work object is automatically clamped in position in the machine concurrently with the rotary operation of the machine. Still a further object is to provide a processing machine wherein the work object may be placed without clamping into the machine and is automatically clamped in the proper position in the machine after the operation of the machine is commenced.

A still further object of this invention is to provide, in a machine of the character indicated, automatic means for clamping the work object and maintaining it in its clamped position under pressure concurrently with the operation of the machine.

Still another object of this invention is to provide a rotary processing machine of the character previously indicated wherein the speed of operation of the machine is automatically increased after completing the processing step, and automatically stopped when the processed work object is transported to a convenient position for ultimate removal from the machine.

Other objects and advantages of the invention, including the simplicity and economy of the same, will appear in further detail hereinafter and in the drawings whereof:

Fig. 2 represents a front view of the apparatus, with certain parts broken away and others shown in section in order more clearly to illustrate important details;

Fig. 3 represents a side elevation of the apparatus, parts being broken away and shown in section in order more clearly to illustrate important details;

Figure 1:
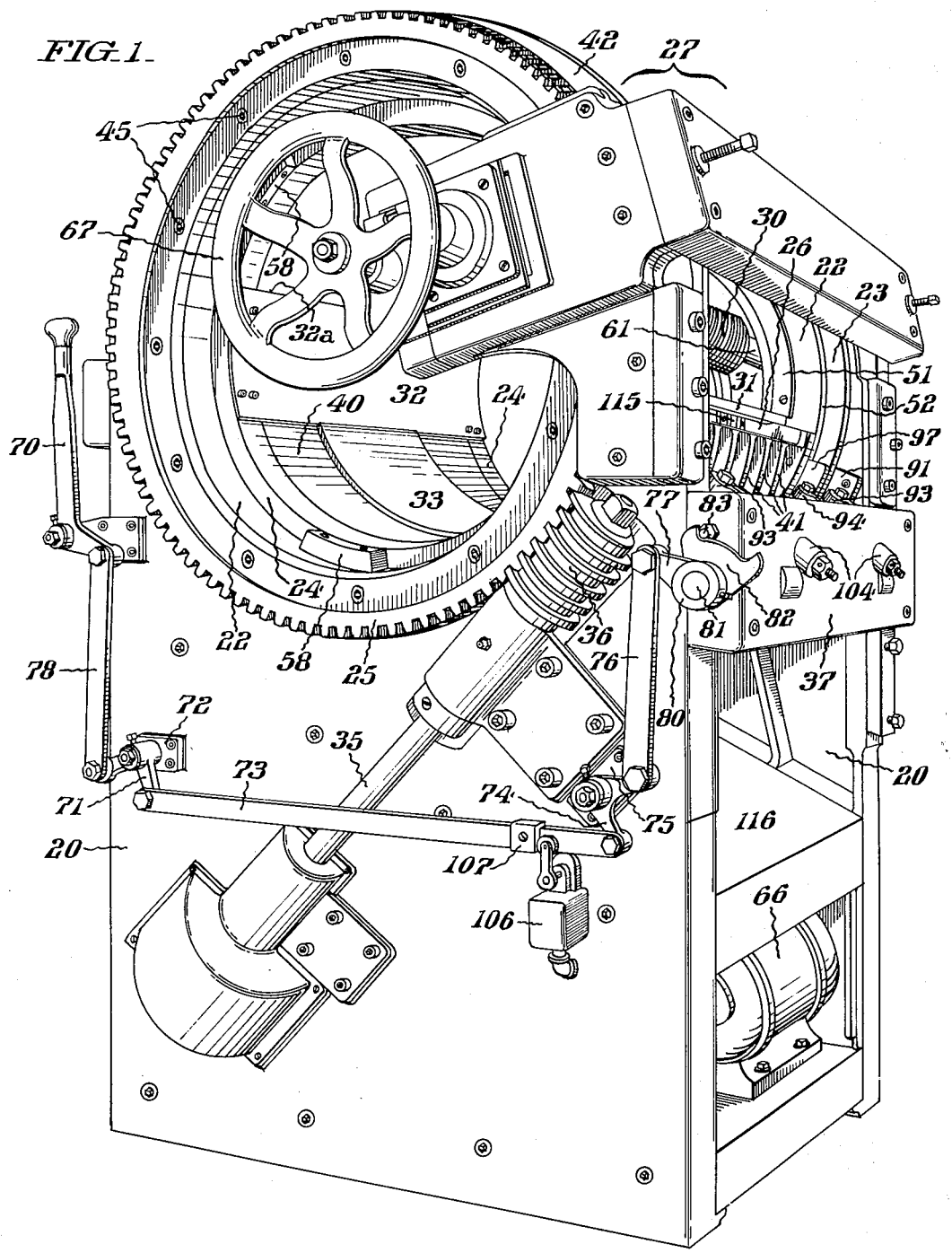
Fig. 1 represents a view in perspective of a machine constituting one specific embodiment of this invention, the parts of the apparatus being in position for starting the milling or shaving operation.
Figure 14:
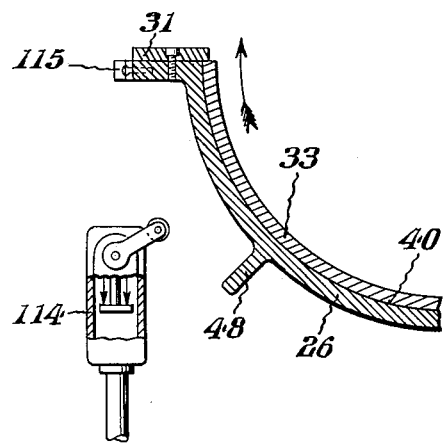
Figure 15:
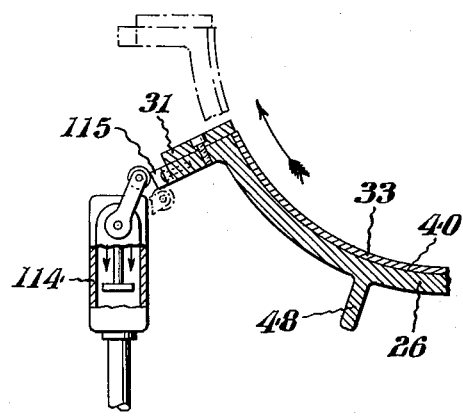
Figure 16:
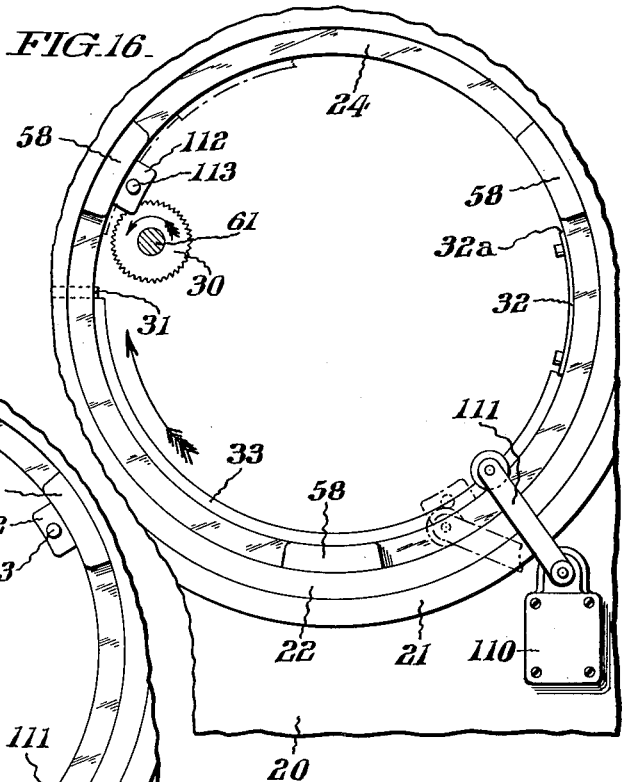
Figure 17:
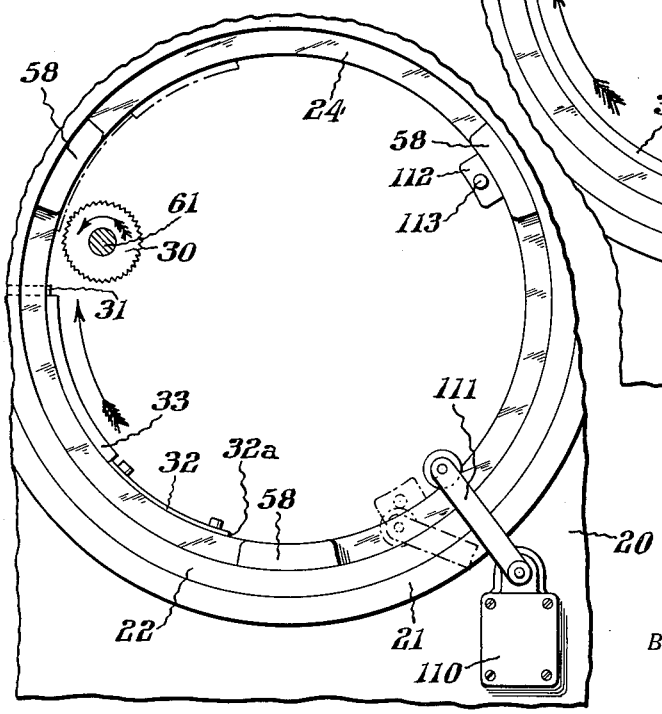

Fig. 4 represents a fragmentary view in perspective, taken as indicated generally by the lines and arrows IV—IV which appear in Fig. 3, the braking means of the apparatus being in its released or inoperative position. In this view certain parts are broken away and shown in section in order more fully to illustrate the construction and operation of the braking means in cooperation with the other elements of the apparatus;

Fig. 5 represents a sectional view taken as indicated by the lines and arrows V—V which appear in Fig. 4;

Fig. 6 represents a view similar to Fig. 5 showing the brake means of the apparatus in an operative position with respect to the other elements of the machine;

Fig. 7 represents a sectional view taken as indicated by the lines and arrows VII—VII which appear in Fig. 5;

Fig. 8 represents a perspective view of a brake cam means constituting one element of the apparatus shown in Figs. 4–7 of the drawings;

Fig. 9 represents in diagrammatic form a sectional side elevation showing the relationship and operation of certain parts of the machine;

Fig. 10 represents a diagrammatic sectional side elevation showing the construction and operation of the clamping means of the machine;

Fig. 11 represents a view similar to Fig. 9, showing alternate positions assumed by the apparatus during the course of its operation;

Fig. 12 represents an end view of a curved plate, showing on an exaggerated scale the character of the product obtained in accordance with conventional shaving operations;

Fig. 13 represents a view similar to Fig. 12, showing a product of the machine represented in Figs. 1–11;

Fig. 14 represents a sectional view taken as indicated by the lines and arrows XIV—XIV which appear in Fig. 2;

Fig. 15 represents a sectional view similar to Fig. 14 showing the relative positions assumed by the elements of the apparatus during the course of its operation;

Fig. 16 represents a fragmentary diagrammatic view in side elevation showing the construction and arrangement of automatic means for increasing the speed of operation of the machine; and Fig. 17 represents a view similar to Fig. 16, showing the relative positions of the parts at another stage in the operation of the machine.

Referring now to the drawings, the specific device illustrated includes a pair of main frames 20 which serve as supports for the operative elements of the machine. Slidably supported on stationary circular bearings 21 which are formed integrally with the frames 20 at each side thereof are bearings 22 which are affixed to a cylinder bed 26. The cylinder bearings 22 also support two internal gears 23 and two plate clamp gears 24 which are slidably fitted around the cylinder bearings 22, at each side of the device. An idler gear 28 is rotatably mounted on the cylinder bearing 22 at each side of the machine and meshed with both the internal and plate clamp gears 23, 24 at each side of the machine. A main drive gear 25 is rigidly affixed to the outside face of one of the cylinder bearings 22. The cylinder bed 26, having a semi-circular cross section, is screwed to the cylinder bearings 22 and movable therewith.

A bed clamp 31 is fixed to the cylinder bed 26 and coacts with a movable or adjustable clamp 32 which is affixed to the plate clamp gear 24 by means of screws and movable relative to the cylinder bed 26. The lower face of movable clamp 32 is substantially flush with the upper face of cylinder bed 26, and movable clamp 32 has capacity to move toward and away from stationary bed clamp 31 immediately adjacent said cylinder bed 26 when the cylinder bearings 22 and the plate clamp gears 24 are rotated relatively to one another.

Also mounted on the main frames 20 is a cutter tool frame 27 which supports a shaving or milling tool 30 together with a positional adjusting device therefor, further to be described in detail.

Drive means are provided for rotating the main drive gear 25 and cylinder bearings 22 as well as the cylinder bed 26 which is affixed thereto. Such drive means includes the motor 34, drive shaft 35 and worm gear 36, rotatably mounted on the main frame 20, and will be described in further detail hereinafter.

Braking means, mounted in brake housing frame 37, are provided for braking the internal gears 23 and locking them against rotation while the cylinder bearings 22 continue to rotate, whereby the idler gear 28 is caused to rotate about its axis and to rotate the plate clamp gears 24 relative to the cylinder bearings 22, and the movable clamp 32 is thereby advanced toward the stationary clamp 31. A curved work-object 33, such as a printing plate, for example, is inserted between the stationary and movable clamps 31, 32 on the cylinder bed 26, and is clamped between the clamps and expanded outwardly against the curved upper surface of the cylinder bed 26 in response to the action of the brake means on the internal gears 23, as the cylinder bed 26 and work object 33 are continuously advanced toward the working position under the milling tool 30.

Referring now to the details of construction of the specific embodiment of the invention selected for illustration in the drawings, the cylinder bed 26 which spans between the sides of main frames 20 is in the form of a rotatable concave die or bed having a uniformly curved cylindrical inner face 40 upon which the work-object or curved plate 33 may be supported. The curvature of the inner face 40 is substantially similar to the curvature of the work-object 33, although in actual practice successive work-objects 33 which are processed in the machine are not uniform as to curvature and do not conform precisely to the upper face 40 when initially placed upon the cylinder bed 26. Formed on the outer face of cylinder bed 26 are a plurality of substantially parallel-longitudinal strengthening ribs 41 and lateral strengthening ribs 48.

The cylinder bed 26 is constructed and arranged to revolve about the centers of a pair of frame caps 42 fixed by bolts 43 on top of main frames 20 at opposite sides of the machine. Each of the frame caps 42 is in the form of an inverted semi-cylinder having a bearing surface 44 coacting with the semi-cylindrical bearing face of the stationary bearings 21 at the top of each main frame 20 to provide a bearing framework having a circular opening therein. The ends of the cylinder bed 26 are affixed to the cylinder bearings 22 which revolve in the circular openings thus provided.

Referring particularly to Fig. 2 of the drawings, it will be observed that the main drive gear 25 is fastened by screws 45 to the adjacent cylinder bearing 22 which is slidable within frame cap 42. Formed in an annular flange 46 on each cylinder bearing 22 are bores sustaining the ends of a gear shaft 47, such bores including enlarged end portions accommodating the idler gears 28 which are fixed near each end of gear shaft 47. Gear shafts 47 are secured together by a coupling 50. The plate clamp gears 24 mesh with idler gears 28 and are maintained in lateral alignment therewith by guard plates 51 and guides 58 which are positioned immediately adjacent the inner faces of the gears 24. The internal gears 23, also meshed with idler gears 28, are maintained in lateral alignment with idler gears 28 by the guides 59 and by annular shoulder elements 52 formed on the cylinder bearings 22.

The main drive gear 25, cylinder bearings 22 and gear shafts 47 are rotated bodily around the axis of main drive gear 25 by power operated means including the drive motor 34, shaft 53, reduction gear 54, shaft 55, bevel gears 56, 57, shaft 35 and worm gear 36 which meshes with main drive gear 25.

The milling or shaving tool 30 is fixed on a transverse shaft 61 mounted in bearings on the frame caps 42. The milling tool 30 is preferably of the rotary helical type driven through sheaves 62, 63 and drive belts 64 from shaft 65 of cutter drive motor 66. The milling tool shaft 61 is adjustably movable bodily toward and away from the cylinder bed 26 by conventional means, not shown, actuatable from the handwheel 67, for regulating the depth of cut to be taken in the work-object 33 by the milling tool 30.

Referring particularly to Fig. 3 of the drawings, the braking means of the apparatus includes a linkage manually operable through brake lever 70, including a link bar 78, a bell crank 71 mounted on a bell crank bracket 72, a link bar 73, a bell crank 74 mounted on bell crank bracket 75, a link bar 76 and a lever 77 which is formed integrally with a sleeve 80 fixed on a brake cam shaft 81 which carries a crank stop 82. A stop pin 83 limits the extent of rotary movement of crank stop 82 about the axis of brake cam shaft 81.

Referring more particularly to Figs. 4–8 of the drawings, the brake cam shaft 81 carries a brake cam 79 which includes a sleeve 84 with a semi-cylindrical cam plate 85 formed integrally therewith. The cam plate 85 has a generally flat cam face 86 with a relatively shallow curved recessed portion 87 and a relatively deep curved recessed portion 90.

Each brake cam 79 is constructed and arranged to operate a brake element which includes the fixed brake shoe 91 and brake lining 92 affixed to the main frame 20 immediately adjacent the outer side face of each internal gear 23, and a movable brake shoe 97 and brake lining 101 adapted to move toward and away from the inner side face of each internal gear 23. Formed integrally with the brake housing frame 37 are pairs of standards 93. A brake shoe support 94 having an integral brake shoe lever 95 is mounted on the standards 93 by means of studs 96, with capacity to swing about the common axis of the studs 96. The brake shoe 97 is pivotally mounted by means of brake shoe stud 100 on the brake shoe support 94. A brake cam roller 102 is mounted on a shaft 103 fixed in the brake shoe support element 94, immediately adjacent the cam faces 86, 87, 90 of brake cam 79. A helical spring 98, normally under compression, is mounted in a housing 104 formed on brake housing frame 37. Spring 98 is continuously urged against the end plate 105 of brake shoe lever 95 and serves to urge each brake cam roller 102 continuously against the corresponding brake cam 79 and each brake lining 101 toward the adjacent face of the corresponding internal gear 23. The depth of the shallow recessed cam portion 87 is limited to the extent that the roller 102 therein is in position to maintain the brake linings 101 spaced away from internal gears 23, the parts being in the relative positions indicated in Fig. 5 of the drawings. However the relatively deep cam face portion 90 permits roller 102 to move to the position represented in Fig. 6 of the drawings, wherein the brake lining 101 is continuously urged against internal gear 23 by spring 98. Accordingly it will be apparent that, by rotating the brake cam shaft 81 through a limited angle in a selected direction, the brake means of the apparatus are selectively rendered operative and inoperative with respect to the internal gears 23.

From Figs. 9–13 of the drawings it will be apparent that the braking means just described is effective when activated to move the movable clamp 32 toward the stationary clamp 31 to clamp the work-object 33 therebetween. When the internal gear 23 is locked against movement by brake shoes 91, 97 and brake linings 92, 101, rotary power applied to main drive gear 25 is transmitted to cylinder bearing 22 thereby moving the idler gear shaft 47 bodily through the arc indicated by the arrow (a) in Fig. 9, the external gear 23 remaining stationary. Idler gear 28 is thereby caused to rotate about its own axis imparting rotation to the plate clamp gear 24 at a rate greater than the rotation of cylinder bearings 22 or the cylinder bed 26 attached thereto. Thus the movable clamp 32 is caused to advance toward the fixed clamp 31 as the cylinder bed 26 rotates, thereby clamping the work-object 33 between the clamps 32, 31. This is important since a work object in the form of a curved sheet or plate, for example, does not necessarily have the same arcuate curvature as the cylinder bed 26. Such a work object 33 is represented in dot-dash lines in Fig. 10. By reason of the opposed forces exerted on the work-object 33 by the clamp members 31, 32 the curved work-object 33 is not only firmly clamped to resist the action of milling tool 30, but is expanded outwardly and pressed continuously from end to end thereof against the uniform inner face 40 of cylinder bed 26 as the clamp members 31, 32 and the work-object 33 pass beneath the milling cutter 30. Thus a milled or shaved plate 33 of precisely uniform curvature and cross sectional thickness, as indicated in Fig. 13, is assured. By contrast, a work-object 33' as indicated in Fig. 12 is obtained by shaving or milling a work-object maintained in the position shown in dot-dash lines in Fig. 10. The work-object 33' is much thicker at its ends than at its center, and is not satisfactory for use as a printing plate in a printing machine, for example.

Turning now specifically to Fig. 11, it will be observed that, if desired, the movable clamp 32 may be advanced toward the fixed clamp 31 manually in order to clamp the work-object 33 in position in a preliminary manner. For this purpose the brake lever 70 is withdrawn to inoperative position and a spring-urged safety switch 106 is yieldably maintained in open position. The power source for drive motors 34 and 66 is connected through safety switch 106 and the motors 34, 66 are accordingly deenergized whenever the brake lever 70 is withdrawn to its inoperative position. By swinging brake lever 70 to the operative position shown in Fig. 9, the projection 107 contacts and closes the safety switch 106, permitting energization of the motors 34, 66 through conventional start switches.

The motor 34 is preferably a two-speed motor initially energized at low speed to drive the work through the milling operation. Moreover, see particularly Figs. 14–17, the apparatus includes automatic means for increasing the speed of the motor 34 after completing the milling operation, and for subsequently deenergizing the motor 34 after the milled work-object has been returned to a convenient position for removal from the machine.

A speed-up switch 110, connected to the dual speed drive motor 34 in conventional manner, is mounted in fixed position on the main frame 20. The switch 110 carries a lever 111 which is normally spring-urged to a position requiring the motor 34 to operate at low speed. Mounted on one of the plate clamp gears 24, at a fixed distance from the movable clamp 32, is a block 112 carrying a pin 113. Lever 111 is disposed in the normal path of advancement of the pin 113 and is actuated thereby to the dot-dash line position of Fig. 16 just after the milling cutter 30 completes the shaving or milling of the work-object 33. For this purpose, the arcuate distance between milling cutter 30 and speed-up switch lever 111, measured in the direction of rotation of the work-object 33, is substantially equal to, but slightly greater than, the distance between the pin 113 and the forward or leading edge of movable clamp 32. In accordance with this construction and arrangement of parts, the speed of the drive motor 34 will automatically be increased shortly after completing the shaving operation, regardless of the size of the work-object 33 processed. Figs. 16 and 17 show, respectively, relatively short and relatively long work-objects 33 with the elements shown in solid lines in position for starting the machine, and the corresponding positions, at the time the drive motor 34 speeds up, shown in dot-dash lines.

The work stop switch 114 is also mounted on the main frame 20 for actuation by the main stop switch trip 115 which is carried by the cylinder bed 26. The work stop switch 114 is connected to the main drive motor 34 and has capacity to deenergize the motor 34 in response to the action of the trip element 115. Upon deenergization of motor 34, the cylinder bed 26 travels by inertia to the position illustrated in dot-dash lines in Fig. 15.

In operation, with the machine stationary and the motors deenergized, the work-object 33 to be processed is placed on the concave inner face 40 of cylinder bed 26, between the stationary and movable clamp elements 31, 32. Neither clamp element 31 nor 32 is necessarily initially in contact with either end of the work-object 33. The brake lever 70 is moved to the operative position as indicated in Fig. 9 of the drawings and the start switch is manipulated to energize the main drive motor 34 and the milling cutter motor 66, rotating the cylinder bearings 22 and cylinder bed 26 as well as milling tool 30. Since the internal gears 23 are locked by the brake means, the plate clamp gears 24 are caused to rotate at a greater rate than the cylinder bearings 22 and cylinder bed 26 in the manner previously described, and the work is clamped as it travels toward the working position relative to the milling cutter 30. As the revolution of the cylinder bed 26 continues, shavings from the milling cutter 30 fall by gravity over the exposed face of movable clamp 32 and over the lagging edge 32a thereof and drop through the space between the plate clamp gears 24 to the inclined collector plate 116. Following the shaving or milling operation the speed of main drive motor 34 is automatically increased as previously described, and the machine is ultimately automatically deenergized. The inactivation of the brake means permits the manual retraction of the movable clamp 32 away from the stationary clamp 31, and withdrawal of the work-object 33 thus processed.

While we have shown and described an apparatus for carrying into effect a specific shaving or milling operation on one face of a curved plate, it will be appreciated that this invention comprehends the substitution of various other tools for a milling or shaving tool in order to practice processing operations of various other kinds, all of which may readily utilize the advantages of this invention.

While we have described our invention with reference to one embodiment thereof, it will be apparent to those skilled in the art that various changes other than those referred to above may be made in the form of the device, that equivalent elements may be substituted for those specifically illustrated in the drawings, and that certain features of the invention may at times be used to advantage independently of the use of other features, all within the scope and spirit of the invention as defined in the appended claims.

Having thus described our invention, we claim:

1. In a machine for processing a concave printing plate the combination comprising a concave bed for the plate, guide means defining a path of rotation of said bed about a predetermined axis, an idler gear rotatable about an axis which is fixed relative to said bed, a control gear and a clamp gear both concentric with said predetermined axis and both meshed with said idler gear, a clamp connected to the clamp gear, drive means connected for rotating said bed, idler gear, clamp gear and control gear bodily about said predetermined axis with zero rotation of the idler gear about its own axis, and means for decreasing the speed of rotation of said control gear thereby causing the idler gear to rotate about its axis causing the clamp gear and clamp to revolve about said predetermined axis faster than said bed.

2. A machine for shaving a concave printing plate comprising a pair of spaced main frames, laterally spaced coaxial cylinder bearings carried by the respective frames, a concave bed fixed to said cylinder bearings, rotatable ring gears having internally extending teeth, said ring gears being supported by the respective cylinder bearings, a rotatable plate clamp rng gear also supported by one of said cylinder bearings, said plate clamp gear being spaced inwardly of the corresponding internal ring gear, an idler gear in mesh with said plate clamp gear and with the corresponding internal ring gear, a plate clamp carried by said plate clamp gear, driving means for rotating the cylinder bearings, and means for decreasing the speed of rotation of the internal gear relative to the rotation of the cylinder bearings, thereby revolving said idler gear and rotating said plate clamp gear causing said plate clamp to rotate faster than said concave bed.

3. A machine for shaving a concave printing plate comprising a concave slab mounted for rotation about a central axis, shaving means supported adjacent said concave slab, a clamp actuating ring gear arranged for rotation adjacent to and substantially concentrically with said slab, fixed clamping means fixed relative to said slab, relatively movable clamping means carried by said clamp actuating gear extending adjacent the inner surface of said slab in substantailly the plane of the printing plate, driving means for rotating said concave slab adjacent to the shaving means, and gear means connected to said driving means and to said clamp gear means to rotate the clamp gear means at a greater angular velocity than said slab, thereby moving the movable clamp toward the fixed clamp and clamping said plate relative to said slab.

4. Apparatus for shaving a concave work-object such as a printing plate or the like, comprising a support, shaving means in position to shave said work-object, a concave bed rotatably mounted on said support for movement toward said shaving means, variable speed drive means for rotating said bed to advance said work-object toward and past said shaving means, adjustable clamping means for clamping said work-object on said bed before the work-object reaches said shaving means, said clamp means being constructed to bear against the opposite ends of the work-object, control means connected to said clamping means to actuate said clamping means and thereby clamp said work-object in response to and concurrently with the rotation of said bed, thereby expanding the work-object outwardly against the bed, and switch means disposed adjacent the path of movement of said bed for changing the speed of said drive means after the work-object passes beyond said shaving means.

5. Apparatus for shaving a concave work-object such as a printing plate or the like, comprising a support, shaving means in position to shave said work-object, a concave bed rotatably mounted on said support for movement toward said shaving means, variable speed drive means for rotating said bed to advance said work-object toward and past said shaving means, a fixed clamp element fixed relative to said concave bed, an adjustable clamp element movable toward and away from the fixed clamp element, said adjustable clamp element having a leading edge with capacity to abut against the trailing end of the work-object to clamp it in position and to expand the work-object against the concave bed as the concave bed rotates, control means connected to said adjustable clamp element and operable in response to bed rotation to move said adjustable clamp element toward said fixed clamp element, a switch actuator fixed relative to said concave bed, a speed-control switch connected to said variable speed drive means and positioned in the path of movement of said switch actuator for changing the speed of said drive means, the arcuate distance between said shaving means and said speed-control switch being somewhat greater than the corresponding arcuate distance between said switch actuator and the leading edge of said adjustable clamp element.

6. Apparatus for shaving a concave work-object such as a printing plate or the like, comprising a support, shaving means in position to shave said work-object, a concave bed rotatably mounted on said support for movement toward said shaving means, drive means for rotating said bed to advance said work-object toward and past said shaving means, adjustable clamping means for clamping said work-object on said bed after bed rotation has started but before the work-object reaches said shaving means, control means connected to said clamping means to actuate said clamping means and thereby clamp said work-object in response to and concurrently with the rotation of said bed, and switch means disposed adjacent the path of movement of said bed for de-energizing said drive means after the work-object passes beyond said shaving means.

7. Apparatus for shaving one face of a concave work-object comprising a support, a concave bed rotatable on said support, said bed being adapted to support said work-object, shaving means adjacent said bed, drive means for rotating said bed relative to said shaving means to bring said work-object into working position relative to said shaving means, adjustable clamp means including a bed clamp element fixed relative to said bed and a movable clamp element movable relative to said bed, said movable clamp element being movable toward and away from said bed clamp element and constructed to bear against an end of the work-object, gear means effective when activated for rotating said bed and said movable clamp element bodily at substantially the same rate, said gear means being effective when braked to cause the movable clamp element to travel in response to the bed rotation faster than said bed toward said fixed clamp element to clamp said work-object in said bed during the course of rotation of said bed, thereby expanding the work-object outwardly against the bed, brake means for inactivating said gear means, and switch means connected to said drive means for de-energizing said drive means when said gear means is activated.

References Cited in the file of this patent

UNITED STATES PATENTS

| | | |
|---|---|---|
| 592,813 | Murray | Nov. 2, 1897 |
| 646,669 | Scott | Apr. 3, 1900 |
| 1,126,741 | Evensen | Feb. 2, 1915 |
| 1,610,219 | Henzi | Dec. 7, 1926 |